United States Patent
Gerdes

(10) Patent No.: US 6,546,326 B1
(45) Date of Patent: Apr. 8, 2003

(54) METHOD FOR ESTIMATING THE PRESSURE IN A WHEEL BRAKE CYLINDER AND CONTROL UNIT FOR CARRYING OUT THE METHOD

(75) Inventor: Manfred Gerdes, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/718,779

(22) Filed: Nov. 22, 2000

(30) Foreign Application Priority Data

Nov. 24, 1999 (DE) .......................... 199 56 553

(51) Int. Cl.[7] .............................. B60T 8/34; B60T 8/32; B60T 8/42
(52) U.S. Cl. ....................... 701/70; 123/295; 303/115.4; 417/568
(58) Field of Search ............................ 701/70; 123/295, 123/430; 303/115.4, 113.2, 116.2, 116.1, 116.4, 6.01, 113.5, 186; 417/568, 218

(56) References Cited

U.S. PATENT DOCUMENTS

| | | | | |
|---|---|---|---|---|
| 4,986,612 A | * | 1/1991 | Arikawa | 303/110 |
| 5,154,491 A | * | 10/1992 | Graham | 303/6.01 |
| 5,173,031 A | * | 12/1992 | Nonnenmacher et al. | 417/218 |
| 5,302,011 A | * | 4/1994 | Volz et al. | 303/116.1 |
| 5,911,484 A | * | 6/1999 | Hashida | 303/115.4 |
| 5,988,137 A | * | 11/1999 | Tamura et al. | 123/295 |
| 6,089,681 A | * | 7/2000 | Watanabe | 303/158 |

FOREIGN PATENT DOCUMENTS

WO    WO 92 05 986    4/1992

* cited by examiner

Primary Examiner—Tan Nguyen
Assistant Examiner—Dalena Tran
(74) Attorney, Agent, or Firm—Kenyon & Kenyon

(57) ABSTRACT

A method for estimating the pressure, i.e., pressure stroke, in a wheel brake cylinder, in particular in connection with a vehicle stability control system for calculating an effective control time, assignable to an instantaneous controller cycle, of an PWM-controlled valve actuating the wheel brake cylinder, on the basis of an actual control time definable by a control unit during the instantaneous controller cycle or an effective control time assignable to a preceding controller system and a valve stroke relative to a maximum stroke; and for calculating a pressure stroke of the wheel brake cylinder between two consecutive controller cycles, based on a valve pressure/volume characteristic retrievable from the control unit; an effective pressure difference across the valve; and the calculated effective control time.

9 Claims, 2 Drawing Sheets

(«METHOD FOR ESTIMATING THE PRESSURE IN A WHEEL BRAKE CYLINDER AND CONTROL UNIT FOR CARRYING OUT THE METHOD»)

METHOD FOR ESTIMATING THE PRESSURE IN A WHEEL BRAKE CYLINDER AND CONTROL UNIT FOR CARRYING OUT THE METHOD

FIELD OF THE INVENTION

The present invention relates to a method for estimating the pressure in a wheel brake cylinder, particularly in connection with a vehicle stability control system, and a control unit for carrying out the method.

BACKGROUND INFORMATION

In vehicle stability control systems, the pressure in the respective wheel brake cylinders is determined as accurately as possible to carry out control as effectively and quietly as possible. A method for estimating pressures of this type in connection with a vehicle stability control system is known from U.S. Pat. No. 5,154,491. Reference is also made to International Published Patent Application No. 92/05986 in this regard. This publication describes an anti-lock brake system in which multiple measured and estimated quantities are used to determine a reference slip value, which is compared to an actual slip value. The difference is converted, along with other quantities, to a reference brake pressure, which is then converted to a valve control time.

The known methods have proven to be relatively expensive in practice.

SUMMARY OF THE INVENTION

An object of the present invention is therefore to provide a method that can be used to easily estimate a pressure prevailing in a wheel brake cylinder, i.e., a pressure change (or pressure stroke) prevailing there, as well as to provide a control unit for carrying out the method.

According to the present invention, wheel brake cylinder pressures that occur, particularly in connection with a vehicle stability control system, can be easily and reliably estimated. Likewise, the method according to the present invention can be implemented, i.e., can be carried out with a corresponding control unit, in all systems and controllers that affect braking to ensure handling stability and/or safety of a vehicle.

Particularly in the case of vehicle stability control systems that meet high comfort and safety standards, slip is controlled by driving intake valves with PWM output stages (known as LMV valves, quiet or linear solenoid valves), where the pressure building up in the wheel brake cylinder is estimated with a high degree of accuracy. The method described according to the present invention, i.e., the corresponding algorithm, is especially well suited for this purpose. The method described can be used to provide a largely modular design of the software for the vehicle stability control algorithm, particularly also in connection with LMV valves, by using the wheel valve control time as an interface quantity.

The pressure is suitably estimated in the wheel brake cylinder based on a pressure determined in the preceding controller cycle and the pressure stroke calculated in an instantaneous controller cycle.

A current rise and fall time deltaT of the valve is preferably taken into account in the control time specified by the control unit and/or in the calculation of the effective control time.

According to a further preferred embodiment, a presettable minimum pressure difference across the valve is determined as a condition for carrying out the method according to the present invention. This measure prevents serious relative errors, which can occur with minimal pressure differences across the valve, from leading to an inaccurate pressure estimate.

The method according to the present invention and a control unit for carrying out the method are especially well suited for controlling a normally open intake valve that actuates a wheel brake cylinder.

DETAILED DESCRIPTION

Figure 1:
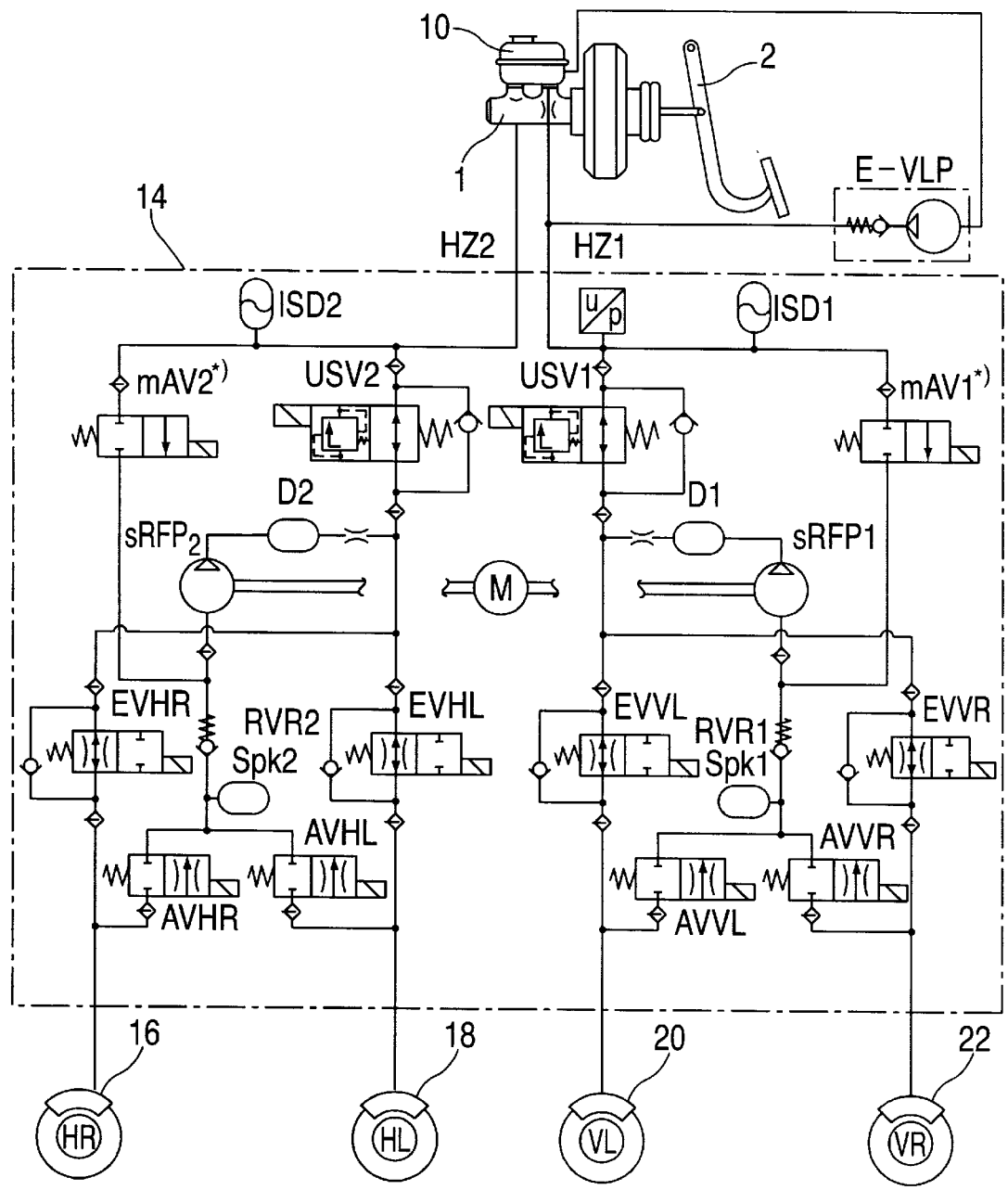
FIG. 1 shows an embodiment of an electrohydraulic brake system in which the method according to the present invention can be advantageously applied.
Figure 2:
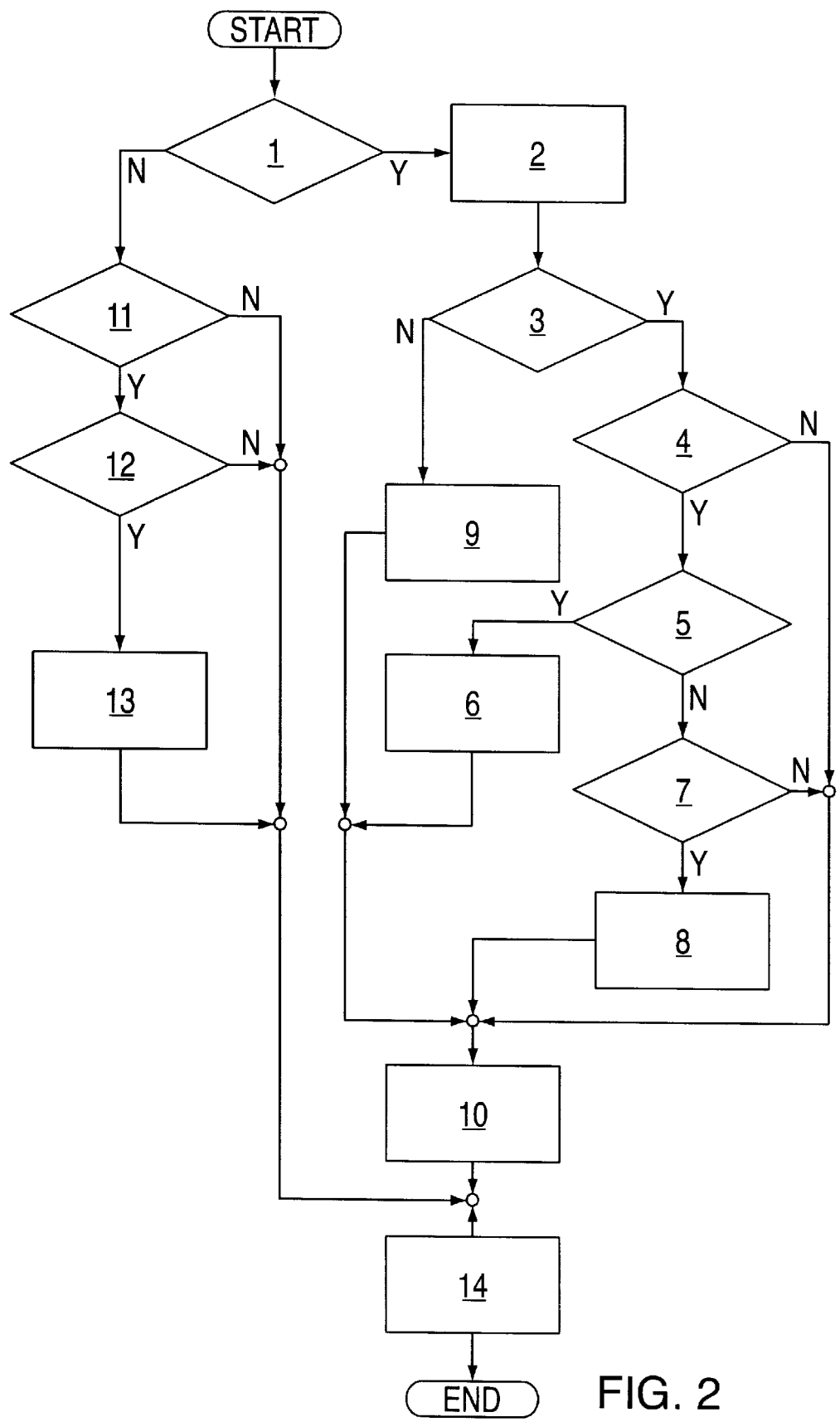
FIG. 2 shows a flowchart for further explaining the method according to the present invention.

FIG. 1 shows an embodiment of an electrohydraulic brake system. It shows a main brake cylinder 1 with a reservoir 10, to which a driver-operated brake pedal 2 is connected. A hydraulic unit 14, which includes valves and pump arrangements for controlling wheel brakes 16, 18, 20, and 22, is also provided. Connected to brake pedal 2 is a brake pedal switch (not illustrated) that closes when the brake pedal is pressed, as well as a measuring unit (also not illustrated) for detecting displacement of the brake pedal. A pedal travel simulator (not illustrated), which simulates a counter-force for the driver when he presses the brake pedal, is also provided.

Two brake circuits HZ1, HZ2 are connected to main brake cylinder 1. Brake circuits HZ1, HZ2 each have a pressure modulator for regulating the brake pressure in each wheel brake. Each pressure modulator has one intake valve EVHR, EVHL, EVVL, EVVR and one discharge valve AVHR, AVHL, AVVL, AVVR. Note that the intake valves are designed as normally open valves and the discharge valves as normally closed valves.

The present invention involves estimating the pressure, i.e., pressure stroke, in the lines leading to the respective wheel brakes.

Based on the example of a normally open intake valve, an algorithm which can be used to easily estimate pressure in connection with a vehicle stability control system is described below, where:

LMV_b is a flag indicating whether or not a PWM, i.e., LMV, controller for the intake valve is active;

dpVent is an effective pressure difference across the intake valve;

deltaT is the duration of the intake valve current fall time in ms;

uVentRad is the wheel valve control time output by the control algorithm during the instantaneous controller cycle, in particular 0 to 20 ms;

uVentRadK1 is the control time output by the control algorithm during the preceding controller cycle, in particular 0 to 20 ms;

tastver is the PWM voltage output by the control algorithm during the instantaneous controller cycle, indicated in percent of voltage at the valve relay and available to the algorithm as a measured quantity. A valve relay is defined in this case as an output stage that controls the valve and conditions control signals from a control unit for the valve;

dpVent is the effective pressure difference across an intake valve;

Uvr is the voltage measured across the valve relay.

The algorithm output quantity is:

uVentHiRes=effective wheel valve control time. The retrieving module of the control unit further uses this control time to calculate the pressure stroke in the wheel brake cylinder.

The following are used as signals calculated in connection with the algorithm:

toffen is the calculated effective valve open time in ms;

deltaT is the calculated current fall time when this signal is not available as an input quantity; and xVentil is the calculated relative valve stroke relative to the maximum valve stroke (0≦xVentil≦1).

Finally, the following are used:

P_Lmvtau is the electromagnetic time constant of the solenoid of the intake valve; and P_L0, P_L1, P_L2, P_L3, P_L4 are application parameters for the precise calculation of the valve stroke.

A first step 1 initially determines whether a pressure difference present across the intake valve exceeds a definable threshold value, e.g., 1.0 bar in the present example. This ensures that the control algorithm is not applied when the pressure difference across the intake valve drops below this threshold value. The purpose of this action is to prevent serious errors, which can occur with low pressure differences, from spreading and leading to generally unreliable control (avoiding an accumulation of computation errors).

If the pressure difference is greater than the threshold value, a flag LMV_b, which can assume a value of only 0 or 1, is set. In the event that the pressure difference across the intake valve exceeds the threshold value, flag LMV_b is set to 1, i.e., true, and the algorithm branches to a step 2. In this step 2, valve open time toffen is pre-assigned as effective wheel valve control time uVentHiRes, which can assume a value between 0 and 20 ms in the present example. uVentHiRes can be the value determined during a preceding control cycle or a value that is specified by the control unit during algorithm initialization. In particular, 20 ms is the duration of one control cycle.

The effective wheel valve control time can be generally interpreted as the time in which the intake valve is opened all the way. A PMW control, i.e., LMV control, can also place the intake valve into a partially open position, so that the intake valve can serve as a controlled stop plate. To reach such a partially open position working point as quickly as possible, it is suitable to specify a minimum PWM energizing value for the duration of current fall time deltaT of the valve. Due to the reduced noise level in slip control mode, the reduction in effective valve open time, i.e., the valve control time, associated with this is suitably taken into account in the estimate of the pressure stroke in the wheel brake cylinder, thus achieving high quality, quiet slip control.

Valve stroke xVentil is also calculated, i.e., estimated, in step 2, based on the formula xVentil=(dpVent×P_L2+P_L3+P_L4+Uvr×tastver)/(P_{L0+P}_L1×dpvent). Valve stroke xVentil is seen in this case as being relative to the maximum valve stroke (xVentil is subsequently incorporated linearly into the estimate of a pressure buildup gradient, or pressure stroke). Voltage Uvr across the valve relay represents a reduced battery voltage and is largely constant. Pulse duty factor tastver of the pulse-width-modulated valve relay, multiplied by voltage Uvr, yields the effective voltage present at the valve relay.

A subsequent step 3 determines whether or not valve current fall time deltaT is equal to 0. For example, the current fall time can be derived from the instantaneous valve working point. It may be useful to set the current fall time to 0 for certain working points or states. This latter instance is discussed further below.

If the current fall time is greater than 0, the algorithm branches to a step 9, in which toffen is set to the previous value for toffen, minus deltaT. In a subsequent step 10, effective valve control time uVentHiRes is calculated as the product of factors xVentil and toffen. Effective valve control time uVentHiRes can be interpreted here as the time during which a controlled stop plate used in place of the valve would be opened.

Because the control cycle duration in this example lasts 20 ms, effective control time uVentHiRes is limited to a value between 0 and 20 ms in a subsequent step 14.

Effective control time uVentHiRes determined in this manner makes it possible to reliably and accurately estimate pressure stroke dpRad in a wheel brake cylinder assigned to the intake valve concerned. Pressure stroke is defined in this case as the pressure difference between two consecutive control cycles. As is known per se, the pressure stroke in the wheel brake cylinder is calculated, i.e., estimated, in connection with a vehicle stability control system, based on the wheel valve control time (uVentRad) of a pressure/volume characteristic of the wheel brake cylinder (pvkenn) stored in the control unit program code, the square root of the effective pressure difference across the valve SQRT (dpVent), and corresponding conversion constants Knorm. The following formula generally applies:

$$dpRad=pvKenn \times uVentRad \times SQRT(dpVent) \times kNorm$$

This equation can be split into two partial equations as follows: Q=uVentRad×SQRT(dpVent)×kNorm1 and dpRad=pvKenn×Q×kNorm2. In this instance, Q represents a volumetric flow equivalent in the sense of the Bernoulli equation.

Note that wheel valve control time uVentRad can assume both positive and negative values, with those values that cause the intake valve to open being viewed as positive values. The above calculation of effective control time applies in particular to such control values of an intake valve.

A situation in which current fall time deltaT is determined to equal 0 is discussed below. In this case, the algorithm branches from step 3 discussed above to a step 4. This step determines whether the control time from the instantaneous control algorithm cycle is greater than 0. If uVentRad turns out to be equal to 0 at this point, this means that there is no intake valve control during the instantaneous cycle, and a pressure stroke has therefore not occurred. If the control time is greater than 0, the conclusion is that the intake valve was controlled during the instantaneous cycle. A subsequent step 5 determines whether control time uVentRadK1 was less than or equal to 0 in a preceding cycle. If so, the conclusion is that the intake valve was controlled during the preceding cycle. In this case, deltaT is preset to P_Lmvtau times the natural logarithm of the pulse duty factor in a subsequent step 6. As already mentioned above, P_Lmvtau is the electromagnetic time constant of the valve solenoid. Step 6 further limits deltaT to values between 0 and 10 ms, for example. This proves to be suitable with a cycle time of 20 ms in the present example. Thus, the maximum value for deltaT is, for example, half the cycle time. The value for toffen is subsequently preset once more as toffen minus deltaT.

However, if step 5 reveals that the control time during the preceding cycle was not less than or equal to 0, the algorithm branches to a step 7, where it is determined whether this control time of preceding cycle uVentRadK1 was greater than or equal to 20 ms, in the present example. If so, it can be concluded that the intake valve was not energized during the preceding cycle. In this case, toffen is preset to uVentRad+P_Lmvtaux(1.0/xVentil−1.0) (step 8).

In the event that the control time of the instantaneous or preceding control algorithm is determined to be greater or less than 0, the values for toffen determined in this manner can be used in place of the valve open time preset in step 2 when calculating the effective valve control time in step 10.

If step 1 determines that the pressure difference across the intake valve does not exceed the preset threshold value, the algorithm branches from step 1 to step 11. This step 11 checks whether uVentRad is greater than 20 ms, in this example. If so, it can be concluded that the intake valve is not presently being energized. In this case, the algorithm branches to a further step 12, which checks whether the wheel valve control time during the preceding cycle was less than or equal to 20 ms in the present example. If so, the conclusion is that the intake valve was not energized during the preceding cycle. If the valve control time during the preceding cycle was less than or equal to, in particular, 20 ms in the present example, effective control time uVentHiRes is preset to uVentHiRes (e.g., specified by the control unit) minus 2.0×P_Lmvtau in a step 13. If, as determined in step 1, the pressure difference across the intake valve does not exceed the specified threshold value, it is suitable to use this value for uVentHiRes calculated in step 13 in a subsequent calculation of the valve stroke.

The algorithm described generally serves to determine the effective valve control time as well as to correctly convert or use this control time to determine the pressure stroke in the wheel brake cylinder. The algorithm is executed once per cycle for each wheel brake cylinder. The algorithm makes it possible to easily and accurately calculate the pressure strokes in the wheel brake cylinder, particularly even when LMV control of the intake valves is used.

The times used, in particular the 20 ms indicated here, can be varied as a function of the actuating elements employed, in particular valves, of pressure modulators, particularly when using electromagnetic or capacitive actuating elements.

Decision value 0 is also used here by way of an example. When using actuating elements with a response other than the one described here during control or power supply, in particular with a delayed response, it can be useful to use decision values other than 0.

The method according to the present invention is processed in a control unit, i.e., a controller, which receives the quantities or derives them from received quantities and controls actuators, in particular the above-mentioned actuating elements, accordingly.

The method can be used in the brake system illustrated in FIG. 1 as well as in other non-illustrated brake systems, and, in particular, in further electrohydraulic or hydraulic systems or in brake-by-wire systems with a hydraulic fallback level. The method can be implemented in and processed by control units present in these systems or implemented in and processed by a separate control unit. For this purpose, the algorithm in the embodiment can be stored in the form of program code on a data medium for implementation and processing in a control unit.

A listing that describes the algorithm in its entirety is attached below:

Algorithm:
if LMV_b=TRUE&&(dpVent>1.0 bar)
then
   toffen:=uVentHiRes.
   xVentil=(dpVent*P_L2+P_L3+P_L4*Uvr*tastver)/P_L0+P_L1*dpVent)
   if deltaT=0
   then
     if uVentRad>0 . . . EV was controlled during cycle
     then
       if uVentRadk1.≦0 . . . energized during preceding cycle
       then
         deltaT:=−P_Lmvtau*naturalLogarithm(tastver)
         Limit: deltaT:=0 . . . deltaT . . . 10 ms)
         toffen:=toffen−deltaT
       else
         if uVentRadK1≧20 ms . . . IV not energized
         then
           toffen:=uVentRad+P_Lmvtau*(1.0/xVentil−1.0)
         endif
       endif
     endif
   else
     toffen :=toffen−deltaT
   endif
   Limit: toffen≧0
   uVentHiRes:=xVentil*toffen
else
   if uVentRad>20 ms . . . EV not presently energized
   then
     if EV was energized during previous cycle uVentRadK1≦20 ms
     then
       uVentHiRes:=uVentHiRes−2.0*P_Lmvtau
     endif
   endif
endif
Limit:20 ms≦uVentHiRes≧0
End of algorithm

What is claimed is:

1. A method for estimating a pressure stroke in a wheel brake cylinder, comprising the steps of:

calculating a first effective control time, assignable to an instantaneous controller cycle, of an actuating element actuating the wheel brake cylinder on the basis of one of a second control time definable by a control unit during the instantaneous controller cycle and the first effective control time assignable to a preceding controller cycle and a stroke of the actuating element relative to a maximum stroke; and calculating the pressure stroke in the wheel brake cylinder between two consecutive controller cycles based on:
   a pressure/volume characteristic, retrievable from the control unit, of the actuating element,
   an effective pressure difference across the actuating element, and
   the calculated first effective control time.

2. The method according to claim 1, wherein:

the pressure stroke is estimated in connection with a vehicle stability control system.

3. The method according to claim 1, wherein:
the actuating element includes a PWM-controlled valve.

4. The method according to claim 1, further comprising the step of:
estimating a pressure in the wheel brake cylinder, based on a pressure determined in a preceding controller cycle and on the pressure stroke calculated in the instantaneous controller cycle.

5. The method according to claim 1, wherein:
a current rise and fall time of the actuating element is taken into account in at least one of the second control time specified by the control unit and in the calculation of the first effective control time.

6. The method according to claim 1, further comprising the step of:
determining a presettable minimum pressure difference across the actuating element.

7. The method according to claim 1, wherein:
the actuating element includes a normally open intake valve.

8. A control unit, comprising:
at least one processor; and
at least one memory device for storing at least one algorithm as a program code that causes the control unit to:
calculate a first effective control time, assignable to an instantaneous controller cycle, of an actuating element actuating a wheel brake cylinder on the basis of one of a second control time definable by a control unit during the instantaneous controller cycle and the first effective control time assignable to a preceding controller system and a stroke of the actuating element relative to a maximum stroke, and
calculate a pressure stroke in the wheel brake cylinder between two consecutive controller cycles based on:
a pressure/volume characteristic, retrievable from the control unit, of the actuating element,
an effective pressure difference across the actuating element, and
the calculated first effective control time.

9. A data medium for storing at least one algorithm that causes a control unit to perform the steps of:
calculating a first effective control time, assignable to an instantaneous controller cycle, of an actuating element actuating a wheel brake cylinder on the basis of one of a second control time definable by a control unit during the instantaneous controller cycle and the first effective control time assignable to a preceding controller system and a stroke of the actuating element relative to a maximum stroke; and
calculating a pressure stroke in the wheel brake cylinder between two consecutive controller cycles based on:
a pressure/volume characteristic, retrievable from the control unit, of the actuating element,
an effective pressure difference across the actuating element, and
the calculated first effective control time.

* * * * *